US006249334B1

(12) United States Patent
Ui et al.

(10) Patent No.: US 6,249,334 B1
(45) Date of Patent: Jun. 19, 2001

(54) IMAGE FORMING APPARATUS

(75) Inventors: Makoto Ui; Fumio Haibara, both of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/441,261

(22) Filed: Nov. 16, 1999

(30) Foreign Application Priority Data

Nov. 20, 1998 (JP) ................................................ 10-330864

(51) Int. Cl.[7] ................................................ G03B 27/32

(52) U.S. Cl. ................................ 355/23; 355/24; 355/26

(58) Field of Search ............................ 355/23–26, 27–29, 355/40–41, 405; 399/361–364, 374

(56) References Cited

U.S. PATENT DOCUMENTS

| | | | | |
|---|---|---|---|---|
| 4,825,245 | | 4/1989 | Fukae et al. | 355/3 |
| 4,928,127 | * | 5/1990 | Stemmle | 346/160 |
| 5,327,207 | * | 7/1994 | Otake et al. | 355/311 |
| 5,528,353 | * | 6/1996 | Ushio et al. | 355/319 |
| 5,604,577 | * | 2/1997 | Wakuda et al. | 399/364 |

FOREIGN PATENT DOCUMENTS

| | | |
|---|---|---|
| 0 380 577 | 8/1990 | (EP) . |
| 0 807 862 | 11/1997 | (EP) . |

* cited by examiner

*Primary Examiner*—Russell Adams
*Assistant Examiner*—Hung Henry Nguyen
(74) *Attorney, Agent, or Firm*—Frishauf, Holtz, Goodman, Langer & Chick, P.C.

(57) ABSTRACT

An image forming apparatus includes: a recording material accommodating device for accommodating recording materials; an image forming device for forming an image on the recording material; a conveyance section for conveying the recording material fed from the recording material accommodating device to the image forming device; a reversal and re-feeding device having a sheet reversal section and a sheet re-feeding section for conducting image formation on two sides of the recording material. After the image is formed by the image forming device on one side surface of the recording material conveyed from the recording material accommodating device through the conveyance section, the recording material is conveyed to the reversal and re-feeding device, and conveyed again to the image forming device through the sheet re-feeding section of the reversal and re-feeding device and the conveyance section, and an image is formed on the other side surface of the recording material by the image forming device. The image forming apparatus further includes a first regulating device provided on the sheet re-feeding section of the reversal and re-feeding device for regulating the recording material conveyed; and a second regulating device provided on the conveyance section in the vicinity of the image forming device for regulating the recording material conveyed.

7 Claims, 5 Drawing Sheets

IMAGE FORMING APPARATUS

BACKGROUND OF THE INVENTION

The present invention relates to an image forming apparatus in which an recording material accommodating means for accommodating recording materials, an image forming means for forming an image onto the recording material, a conveyance section to convey the recording material from the recording material accommodating means to the image forming means, and a reversal and sheet re-feeding means having a sheet re-feeding reversal section and a sheet re-feeding conveyance section for conducting image formation on two-sides of the recording material are provided, and by which images can be formed on two-sides of the transfer material.

Conventionally, a following image forming apparatus in which an recording material accommodating means for accommodating a recording material, an image forming means for forming an image onto the recording material, a conveyance section to convey the recording material from the recording material accommodating means to the image forming means, and a reversal and sheet re-feeding means having a sheet re-feeding reversal section and a sheet re-feeding conveyance section for conducting image formation on two-sides of the recording material are provided, and by which images are formed on two-sides of the transfer material, is widely spread to a copier, printer, facsimile device, and the like. In such the image forming apparatus, for example, an image forming apparatus for forming an image by the electrophotographic method has the following structure to form two-sided images: an image forming means such as a charging means, image writing means and developing means, is arranged around an image carrier; by using the image forming means, after the image carrier is uniformly charged by the charging means, an electrostatic latent image is formed on the image carrier by the image writing (image exposure) of the image writing means, and the latent image is developed by developers involved in the developing means and formed into a visible toner image; the toner image is transferred onto one-side of the recording sheet conveyed from the recording material accommodating means through the conveyance section, and the toner image is formed on the recording sheet; after the toner image on the one-side of the recording sheet is fixed by the fixing means, the recording sheet is conveyed to the reversal and sheet re-feeding means through a sheet delivery and reversal means, and conveyed to the image forming means through the sheet re-feeding reversal section, a sheet re-feeding conveyance section and conveyance section again of the reversal and sheet re-feeding means; the toner image is formed on the other side of the recording material by the image forming means; the toner image on the other side of the recording material is fixed; and thereby, two-sided images are formed.

Such the image forming apparatus has, generally, a register roller to temporarily stop the recording material in the vicinity of the front of the image forming means, in order to adjust the timing of the recording material conveyed from the recording material accommodating means through the conveyance section, and the recording material conveyed through the sheet re-feeding reversal section structured by the delivery sheet and reversal means and the reversal and sheet re-feeding means to form the two-sided images, the sheet re-feeding conveyance section and the again conveyance section, to the image formation by the image forming means. The register roller is structured such that the recording material is temporarily pushed to the register roller and stopped so that the conveyance of the recording sheet is in timed relationship with the image formation. Further, the register roller is structured such that, after the register roller temporarily stops the recording material, the register roller forms a loop on the recording sheet, and thereby, the skew of the leading edge of the recording material can be corrected.

As described above, by a register roller provided in the vicinity of the front of the image forming means, the timing of the recording material to the image formation is adjusted, and further, the skew of the leading edge of the conveyed recording material is corrected, and thereby, the two-sided images are formed on a correct position of the recording material.

However, recently, in the smaller image forming apparatus, an increase of copy sheets (an increase of productivity) per unit time is required, and an increase of speed is intended. Accordingly, an improvement of each portion of the image forming apparatus or the more exact control of the sheet conveyance is tried, however, there are problems such as the cost-up of the image forming apparatus or the lowering of the reliability by the complexity of the control, and the satisfied improvement can not be attained.

That is, in the image forming apparatus to form the two-sided images, after the fixing, the conveyance path of the recording material to the reversal and sheet re-feeding means in which the recording material is reversed by the sheet re-feeding reversal section and re-fed by the sheet re-feeding conveyance section through the sheet delivery and reversal means for the two-sided image formation, is long, and by the cause of an increase of the frictional resistance between the recording material and the conveyance guide, or an increase of slippage between the recording material and the conveyance roller, a large sheet skew is generated at the conveyance path of the sheet delivery and reversal means before the recording material is arrived at the register roller, or the reversal and sheet re-feeding means, and the sheet skew cannot be corrected by the correction of the sheet skew of the register roller provided in the vicinity of the front of the image forming means, and there occurs a problem that reverse toner image can not be formed at the correct position on the recording material. This sheet skew becomes conspicuous, the more increase of the speed of the apparatus is intended, and the longer is the conveyance path at the sheet delivery and reversal means or the reversal and sheet re-feeding means.

SUMMARY OF THE INVENTION

The object of the present invention is to solve the foregoing problems and to provide an image forming apparatus by which the sheet skew of the recording material conveyed on the reversal and sheet re-feeding means is corrected, the reversal side toner image is formed on the correct position of the recording material, and good two-sided images can be formed.

The above object can be attained by any one of the following structures.

An image forming apparatus in which an recording material accommodating means for accommodating recording materials, an image forming means for forming an image onto the recording material, a conveyance section to convey the recording material from the recording material accommodating means to the image forming means, and a reversal and sheet re-feeding means having a sheet re-feeding reversal section and a sheet re-feeding conveyance section for conducting image formation on two-sides of the recording material are provided, and after the image is formed by the image forming means on one side surface of the recording material conveyed through the conveyance section from the recording material accommodating means, the recording material is conveyed to the reversal and sheet re-feeding means, and conveyed to the image forming means through the sheet re-feeding conveyance section of the reversal and sheet re-feeding means and the again conveyance section, and an image is formed on the other side of the recording material by the image forming means, the image forming apparatus characterized in that the first skew correction means for correcting the skew of the conveyed recording material is provided on the sheet re-feeding conveyance section of the reversal and sheet re-feeding means, and the second skew correction means for correcting the skew of the conveyed recording material is provided on the conveyance section arranged in the vicinity of the image forming means.

An image forming apparatus in which an recording material accommodating means for accommodating a recording material, an image forming means for forming an image onto the recording material, a conveyance section to convey the recording material from the recording material accommodating means to the image forming means, and a reversal and sheet re-feeding means having a sheet re-feeding reversal section and a sheet re-feeding conveyance section for conducting image formation on two-sides of the recording material are provided, and after the image is formed by the image forming means on one side surface of the recording material conveyed through the conveyance section from the recording material accommodating means, the recording material is conveyed to the reversal and sheet re-feeding means, and conveyed to the image forming means through the sheet re-feeding conveyance section of the reversal and sheet re-feeding means and the again conveyance section, and an image is formed on the other side of the recording material by the image forming means, the image forming apparatus characterized in that the first collision means with which the conveying recording material collides is provided on the sheet re-feeding conveyance section of the reversal and sheet re-feeding means, and the second collision means with which the conveying recording material collides is provided on the conveyance section arranged in the vicinity of the image forming means.

DETAILED DESCRIPTION OF THE PREFERRED EMBODIMENT

Hereinafter, embodiments of the present invention will be described. Incidentally, the present description does not limit the technical scope or terminology of claims. Further, a conclusive explanation in the present embodiment hereinafter shows a best mode, and does not limit the terminology or the technical scope.

Figure 1:
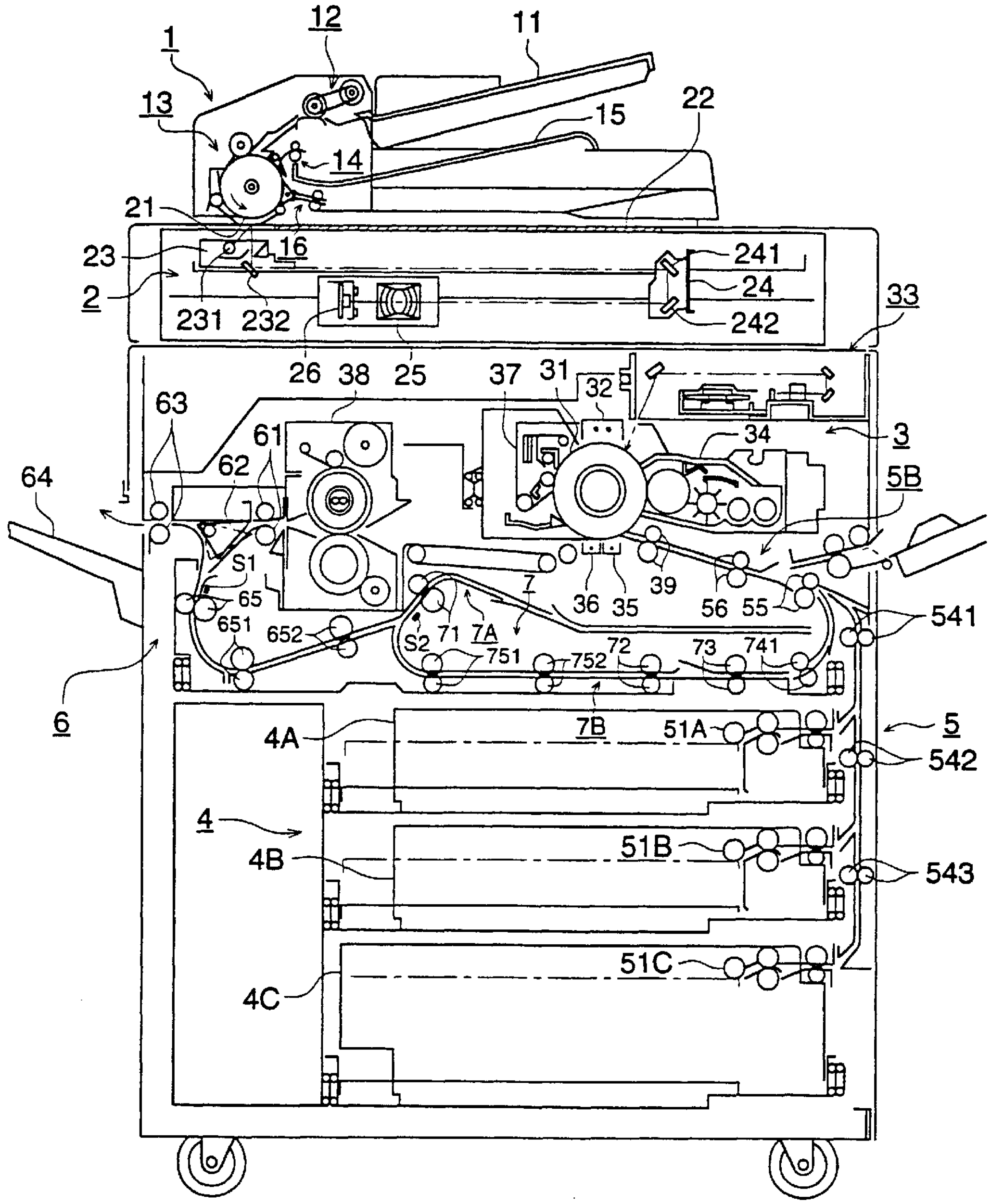
FIG. 1 is a schematic sectional view of a copier using an electrophotographic method, which shows an embodiment of an image forming apparatus according to the present invention.

Initially, referring to FIG. 1, an overall structure and outline processes of a copier of an embodiment of the image forming apparatus of the present invention will be described. FIG. 1 is a schematic sectional view of the copier using an electrophotographic method, which shows an embodiment of the image forming apparatus according to the present invention.

According to FIG. 1, the copier of the present embodiment is provided with an automatic document feeding apparatus 1 on the upper portion of the copier main body, and has an image reading apparatus 2, image forming means 3, recording sheet accommodating means 4, conveyance means 5, conveyance section 5B, sheet delivery and reversal means 6 and reversal and sheet re-feeding means 7, in the copier main body.

The automatic document feeding apparatus 1 is provided on the upper portion of the copier main body, and is the apparatus which feeds the document one by one page, conveys it to the image reading position of the document, and delivers the document whose reading is completed. The automatic document feeding apparatus 1 has a document placement board 11 to pace the document, document separation means 12 for separating the document placed on the document placement board 11, document conveyance means 13 for conveying the document separated by the document separation means 12, document delivery means 14 for delivering the document conveyed by the document conveyance means 13, document delivery board 15 which receives the document delivered by the document delivery means 14 and places the document, and document reversal means 16 for reversing the obverse and reverse sides of the document when the two-sided images of the document are read.

A plurality of documents placed on the document placement board 11 is separated by the document separation means 12 and conveyed one by one sheet. The document separated and conveyed by the document separation means 12 is conveyed by the document conveyance means 13, and the image of the document is read by the image reading apparatus 2 provided below, through a slit 21. The document whose image is read is delivered onto the document delivery board 15 by the document delivery means 14. Incidentally, when images of the two-sides of the document are read, the obverse and reverse sides of the document whose image is read, are reversed by the document reversal means 16, and the document is conveyed again by the document conveyance means 13, and images of the reverse side of the document is read through the slit 21 by the image reading means. Then, the document whose reverse side image is read is delivered onto the document delivery board 15 by the document delivery means 14. Such the process is repeated for the number of document sheets placed on the document placement board 11, and the image of the document is read.

Further, the automatic document feeding apparatus 1 is integrally structured as a tiltable type, and when the automatic document feeding apparatus 1 is raised and an upper side of the platen glass is opened, the present embodiment is structured such that the document can be directly placed on the platen glass. Incidentally, although the present embodiment is structured such that the document image is read while the document is being conveyed by the document conveyance means 13, but it may be structured such that the document conveyed by the document conveyance means 13 is stationary placed on the platen glass 22 and the image is read.

The document reading apparatus 2 is a means for reading an image of the document and for obtaining the image data, and provided on the upper portion of the copier main body. The image reading apparatus 2 has: a slit 21 which is a slit-like opening for reading an image of the document conveying by the document conveyance means 13 of the automatic document feeding apparatus 1; a platen glass 22 which is an document board to directly place (stationary place) the document; the first mirror unit 23 into which the lamp 231 which is a light source to irradiate light onto the document is integrated with the first mirror 232 to reflect the reflected light from the document; a V mirror unit 24 into which the second mirror 241 to reflect the light from the first mirror unit 232 and the third mirror 242 are integrated; an image formation lens 25 which is an image formation means to image form the reflected light from the document on the slit 21 or the platen glass 22 onto a CCD 26 which will be described later; and a linear CCD 26 which is an image reading means for photo-electrically converting the light image formed by the image formation lens 25 and obtaining an image information.

When the document fed by the automatic document feeding apparatus 1 is read by the image reading apparatus 2, the first mirror unit 23 and the V mirror unit 24 are moved to the left in FIG. 1, and the first mirror unit 23 is positioned at a lower portion of the slit 21. The document conveying on the slit 21 by the document conveyance means 13 is light-irradiated by the lamp 231, and the reflected light from the document is entered into the CCD 26 though the first mirror 232, the second mirror 241, the third mirror 242, and the image formation lens 25. In the CCD 26, the incident light is photo-electrically converted, and an image of the document in the primary scanning direction (the direction perpendicular to the surface of FIG. 1) is read, on the one hand, because the document is moved in the subsidiary scanning direction by the document conveyance means 13, the image of entire surface of the document can be read. The image information read by the CCD 26 is appropriately image processed, and supplied to the laser writing system 33, which will be described later.

Further, when the document is directly placed on the platen glass 22, the image of the document can be read while the first mirror unit 23 and the V mirror unit 24 are being moved in the right direction in FIG. 1 along the platen glass.

The image forming means 3 is a means for forming the image onto the recording sheet, which is the recording material conveying at a predetermined process speed, according to the image data obtained by the image reading apparatus 2. The image forming means 3 of the present embodiment forms an image using the electrophotographic process. The image forming means 3 has: a photoreceptor drum 31, which is an image carrier having a photoconductive photoreceptor layer and carry the toner image; a charger 32, which is a charging means for uniformly charging the photoreceptor drum 31; a laser writing system 33, which is an image writing means for exposure-scanning on the photoreceptor drum 31 and forming the latent image, according to an image information read by the CCD 26; developing units 34, which are a developing means for developing the latent image on the photoreceptor drum 31 and forming the toner image; a transfer device 35, which is a transfer means for transferring the toner image carried on the photoreceptor drum 31 onto the recording sheet which is separately conveyed; a separation device 36, which is a separation means for separating the recording sheet onto which the toner image is transferred, from the photoreceptor drum 31; a cleaning means 37 for removing the residual toner on the photoreceptor drum 31 after transferring; and a fixing means 38 for fixing the toner image on the recording sheet. The charger 32, laser writing system 33, developing units 34, transfer device 34, separation device 36, cleaning means 37 are arranged around the photoreceptor drum 31.

The photoreceptor drum 31 is rotated in the arrowed direction by a driving means, not shown, and a uniform charging by the charger 32, the latent image formation by the laser writing system 33, and development by the developing units 34 is carried out, and the toner image is formed according to the image information read by the CCD 26.

The recording material accommodating means 4 is an accommodating means of the recording material for accommodating a plurality of recording sheets in a laminated condition. In the present embodiment, a plurality of recording material accommodating means 4A–4C as the recording material accommodating means 4 are arranged in multi-stages lower than the image forming means 3 and the reversal and sheet re-feeding means 7, which will be described later. As the recording material accommodating in these recording material accommodating means 4A–4C, other than the recording sheet such as plain paper or regenerated paper, various media such as OHT, or the like, are used.

The conveyance means 5 is a conveyance means for conveying the recording material from the recording material accommodating means 4 to the image forming means 3, and is structured such that the recording sheet accommodated in each of recording material accommodating means 4A–4C can be conveyed through the intermediate conveyance rollers 541–543 to the conveyance section 5B.

The conveyance section 5B has the second skew correction means structured by the second loop formation roller 55, which will be detailed later, and the register roller 56, and is a feeding path of the recording sheet from the second loop formation roller 55 to the transfer position of the photoreceptor drum 31, and the conveyance section 5B is structured by the second loop formation roller 55, register roller 56, and conveyance roller 39 before the drum provided at need. The recording sheet conveyed by an intermediate conveyance roller 541 or a sheet re-feeding intermediate conveyance roller 741 is fed through conveyance section 5B to the image forming means 3.

The recording sheet as the recording material is fed by pick-up rollers 51A–51C from any one of recording material accommodating means 4A–4C, and conveyed to the register roller 56 through the intermediate conveyance roller 541.

The recording sheet is in timed relationship with the toner image carried on the photoreceptor drum 31 by the drive of the register roller 56, and fed to the transfer area of the photoreceptor drum 31 in which the transfer device 35 is arranged.

The toner image formed on the photoreceptor drum 31 is transferred onto the one side surface (the obverse side of the recording sheet) by the transfer device 35. The recording sheet onto whose one side surface the toner image (obverse side toner image) is transferred, is separated from the photoreceptor drum 31 by the separation device 36, conveyed to the fixing means 38, and therein, by the heating and pressure, the toner image is fixed on the recording sheet. On the one hand, the photoreceptor drum 31 from which the toner image is transferred onto the recording sheet, is further rotated, and the residual toner on the photoreceptor drum 31 is removed by the cleaning means 37, and the photoreceptor drum 31 is ready for the next image formation.

Incidentally, in the present embodiment, the conveyance roller 39 before drum to convey the recording sheet fed from the register roller 56 is provided in the vicinity of the photoreceptor drum 31 between the photoreceptor drum 31 and the register roller 56, and it contributes to an increase of the conveyance power of the recording sheet. Further, a conveyance roller (no code) and a belt (no code) to support the lower side of the recording sheet (reverse side to the image formed side) and convey it, are provided between the separation device 36 and the fixing means 38 so that the recording sheet which is separated by the separation device 36, is conveyed.

The sheet delivery and reversal means 6 is a means for re-feeding the recording sheet, on which the image is formed by the image forming means 3, conveyed by the conveyance means 5 and the conveyance section 5B, to the sheet delivery or reversal and sheet re-feeding means 7, which will be described later. The sheet delivery and reversal means 6 has: a fixing delivery roller 61 to deliver the recording sheet on which the toner image is fixed, from the fixing means 38; a switching means 62 for switching the conveyance path corresponding to the case where the recording sheet delivered from the fixing delivery roller 61 is delivered outside the apparatus without additional operation, and the case where the recording sheet is delivered after its obverse side and reverse side are reversed, or the recording sheet is re-fed to form an image on the reverse side; a delivery roller 63 to deliver the recording sheet outside the apparatus; a delivery sheet tray 64, provided on the side surface of the copier, to stack the recording sheet delivered by the sheet delivery roller 63; and a sheet delivery and reversal roller 65 and sheet delivery and reversal conveyance rollers 651 and 652, to reverse the obverse and reverse sides of the delivered recording sheet, or to convey the recording sheet to the reversal and sheet re-feeding means 7. Further, S1 is a recording sheet detection means composed of, for example, a photo-coupler, and is provided just before the sheet delivery and reversal roller 65 in the conveyance direction of the recording sheet, in order to detect the trailing edge of the recording sheet at the time of the reversal sheet delivery of the recording sheet.

When the recording sheet on which an image is formed, is delivered as it is, that is, the surface on which an image is formed, is facing upward and delivered, the switching means 62 is positioned at a position shown by a one-dotted chain line in FIG. 1, and the recording sheet is delivered onto the delivery sheet tray 64 outside the apparatus by the fixing delivery roller 61 and the sheet delivery roller 63. Further, when the obverse and reverse sides of the recording sheet on which an image is formed, are reversed and delivered (reversal sheet delivery), that is, the surface on which an image is formed, is facing downward and delivered, the switching means 62 is positioned at a position shown by a solid line in FIG. 1, and the recording sheet conveyed by the fixing sheet delivery roller 61, is temporarily conveyed by the delivery sheet and reversal roller 65, and when the trailing edge of the conveyed recording sheet is detected by the recording sheet detection means S1, the rotational direction of the delivery sheet and reversal roller 65 is reversed, and the recording sheet is conveyed, and delivered to the delivery sheet tray 64 outside the apparatus by the delivery sheet roller 63.

Next, when an image is formed on the reverse side of the recording sheet (in the case of the two-sided image formation), the switching means 62 is positioned at a position shown by a solid line in FIG. 1, and the recording sheet conveyed by the fixing delivery roller 61 is conveyed to the delivery sheet and reversal roller 65, and conveyed to reversal and sheet re-feeding means 7 by the delivery sheet reversal roller 65 and the delivery sheet and reversal conveyance rollers 651 and 652. In this case, in order to increase the productivity of the two-sided copy, the recording sheet is conveyed at a higher speed than the predetermined process speed.

The reversal and sheet re-feeding means 7 is a means structured by a sheet re-feeding reversal section 7A to switch back the recording sheet conveyed by the delivery sheet and reversal means 6, and the sheet re-feeding conveyance section 7B to re-feed the recording sheet reversed and conveyed by the sheet re-feeding reversal section 7A to the conveyance section 5B. The sheet re-feeding reversal section 7A is provided with the sheet re-feeding reversal roller 71, and the recording sheet detection means S2, for example, using the photo-coupler, which is arranged just before the sheet re-feeding reversal roller 71 in the conveyance direction of the recording sheet, and to detect the trailing edge of the recording sheet at the time of the reversal sheet re-feeding.

The sheet re-feeding reversal section 7A temporarily conveys at high speed the recording sheet conveyed at high speed by the sheet delivery and reversal roller 65 and the sheet delivery and reversal conveyance rollers 651 and 652 of the delivery sheet and reversal means 6, by the sheet re-feeding reversal roller 71, and when the trailing edge of the conveyed recording sheet is detected by the recording sheet detection means S2, the rotational direction of the sheet re-feeding reversal roller 71 is reversed, and the conveyance speed is made to be a predetermined process speed, and the recording sheet is conveyed to the sheet re-feeding conveyance section 7B.

The sheet re-feeding conveyance section 7B has the first skew correction means structured by the first loop formation roller 72, which will be detailed later, and the pre-register roller 73, and is a sheet re-feeding conveyance path of the recording sheet from a sheet re-feeding conveyance roller 751, to which the recording sheet is conveyed from the sheet re-feeding reversal roller 71 of the sheet re-feeding reversal section 7A, to the second loop formation roller 55 through the first loop formation roller 72 and the pre-register roller 73, and the sheet re-feeding conveyance section 7B is structured by sheet re-feeding conveyance rollers 751 and 752, a plurality of which are provided at need, in the conveyance direction of the recording sheet, the first loop formation roller 72, the pre-registration roller 73, and a sheet re-feeding intermediate conveyance roller 741 provided at need.

The recording sheet from the sheet re-feeding reversal roller 71 of the sheet re-feeding reversal section 7A joins the second loop formation roller 55 through the sheet re-feeding conveyance rollers 751 and 752 provided in the sheet re-feeding conveyance section 7B, the first loop formation roller 72, the pre-register roller 73, and the sheet re-feeding intermediate conveyance roller 741, and in the same manner as the sheet feeding from the recording sheet accommodating means 4, the recording sheet is conveyed to the image forming means 3 through the conveyance section 5B again, and reverse side toner image formed on the photoreceptor drum 31 is transferred onto the other side of the recording sheet(reverse side of the recording sheet) by the transfer device 35. The recording sheet onto the other side of which the reverse side toner image is transferred, is separated from the photoreceptor drum 31 by the separation device 36, conveyed to the fixing means 38, therein, the reverse side toner image on the recording sheet is fixed and the two-sided images are formed by heating and pressure, and the recording sheet is delivered onto the delivery sheet tray 64 through the delivery sheet and reversal means 6. On the one hand, the photoreceptor drum 31 whose reverse side toner image is transferred onto the recording sheet is further rotated, and the residual toner on the photoreceptor drum 31 is removed by the cleaning means 37, and the photoreceptor drum 31 is ready for the next image formation.

Incidentally, in the above description, each roller pair to convey the recording sheet is structured by a pair of drive and driven rollers, and is rotated and driven by a drive means (not shown) respectively driven according to the drive signal by the control means, not shown.

As described above, the two-sided image formation in which obverse and reverse toner images are formed on the two-sides of the recording sheet, is carried out. When a plurality of sheets of the two-sided copy is carried out, for the number of sheets which can be positioned from the separation position of the photoreceptor drum 31 to the sheet re-feeding conveyance section 7B, in the present embodiment, initially, for about 3–5 sheets (for example, in the case of A-4 size horizontal feeding, 5 sheets, or in the case of A-3 size vertical feeding, 3 sheets) of recording sheets, the obverse side image formation is continuously carried out, and the recording sheets are positioned from the separation position of the photoreceptor drum 31 to the sheet re-feeding conveyance section 7B, and next, for the number of the recording sheets which are positioned from the separation position of the photoreceptor drum 31 to the sheet re-feeding conveyance section 7B, the reverse side image formation is continuously carried out, and by repeating this, a plurality of sheets of the two-sided copy are carried out. Of course, according to the length from the separation position of the photoreceptor drum 31 to the sheet re-feeding conveyance section 7B, the processing number of sheets per one time is determined.

However, in the image forming apparatus by which the above described two-sided images are formed, after fixing, because the conveyance path of the recording sheet to the reversal and sheet re-feeding means 7 in which, through the sheet delivery and reversal means 6 for the two-sided image formation, the recording sheet is reversed in the sheet re-feeding reversal section 7A, and re-fed in the sheet re-feeding conveyance section 7B, becomes long, and therefore, due to factors of an increase of the frictional resistance of the recording sheet and the conveyance guide (no cord), or an increase of slippage among the recording sheet and rollers of delivery sheet and reversal means 6 or the reversal and sheet re-feeding means 7, a large sheet skew is generated before the recording sheet reaches the register roller 56 located in the vicinity of the front of the image forming means 3, and it can not be corrected by the correction of the sheet skew by the register roller 56, and it is difficult to form the reverse side toner image on the correct position of the recording sheet. The more an increase of speed of the sheet delivery and reversal means 6 and the sheet re-feeding reversal section 7A is intended, or the longer the conveyance path of the sheet delivery and reversal means 6 and the sheet re-feeding reversal section 7A is, the more conspicuous this sheet skew is.

Figure 2:
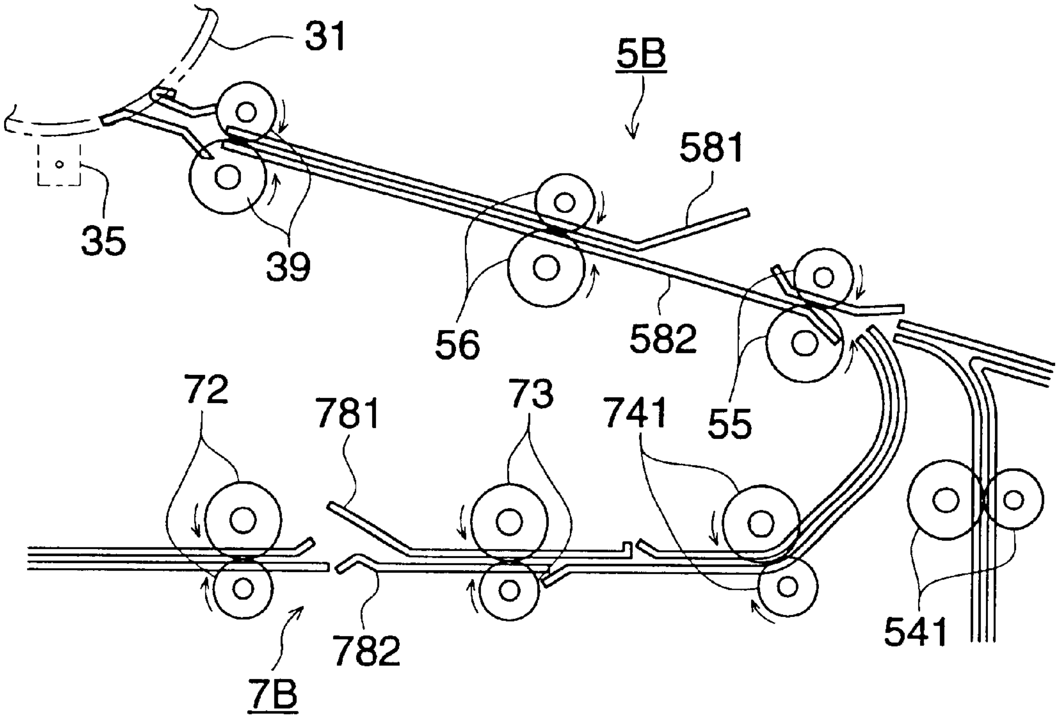
FIG. 2 a partial enlargement sectional view of a sheet re-feeding conveyance section and a conveyance section in FIG. 1.
Figure 3:
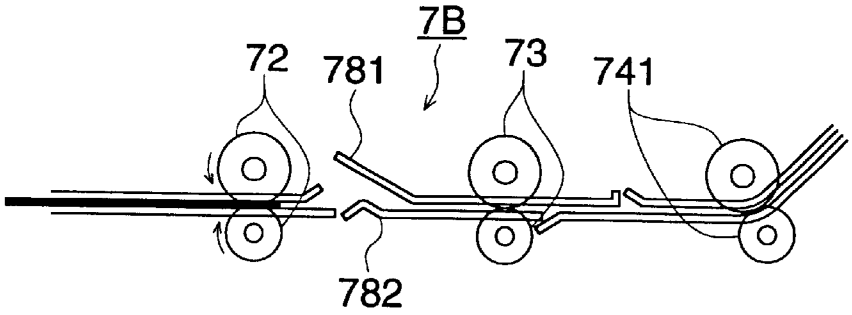
FIGS. 3(A)–3(D) are illustrations showing the conveyance of a recording material in the first skew correction means provided on the sheet re-feeding conveyance section.
Figure 3:
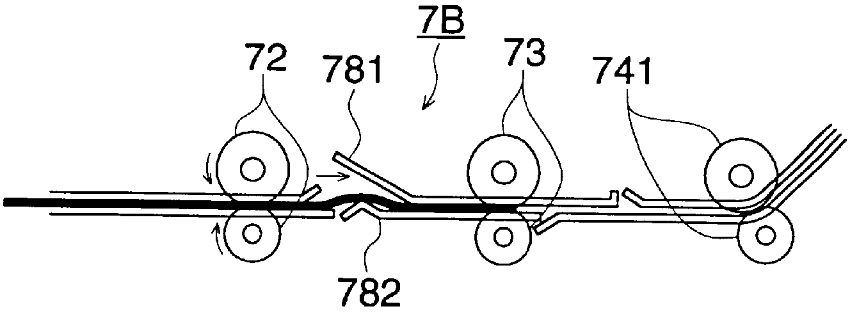
Figure 3:
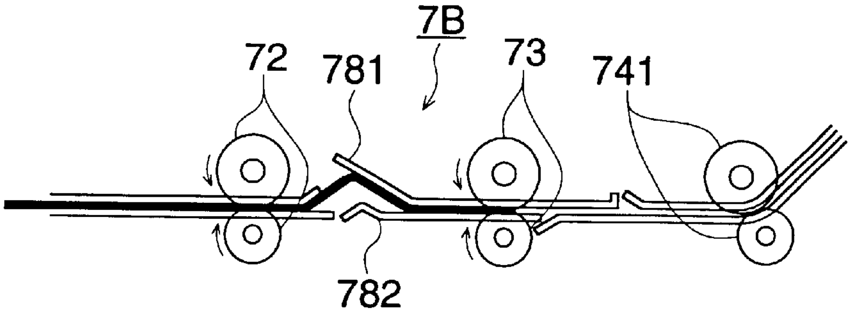
Figure 3:
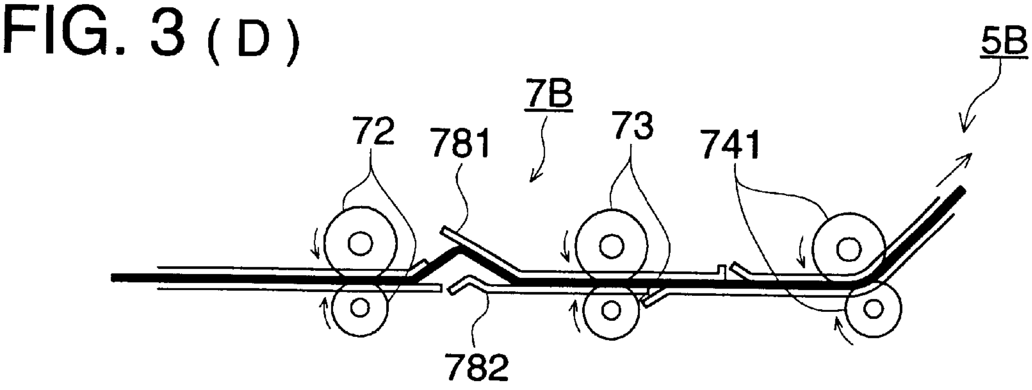
Figure 4:
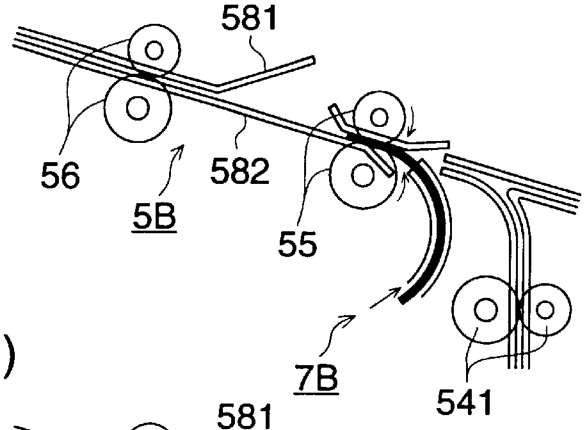
FIGS. 4(A)–4(D) are illustrations showing the conveyance of the recording material in the second skew correction means provided on the conveyance section.
Figure 4:
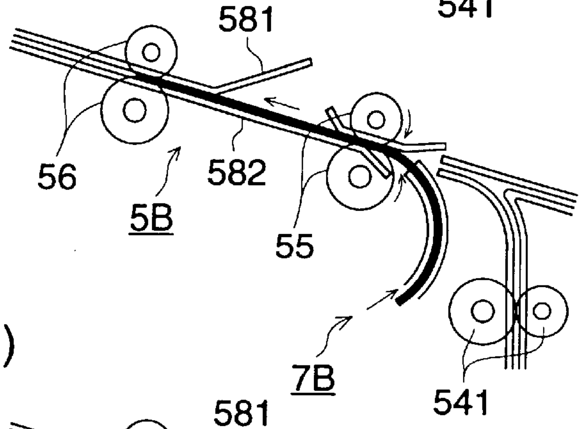
Figure 4:
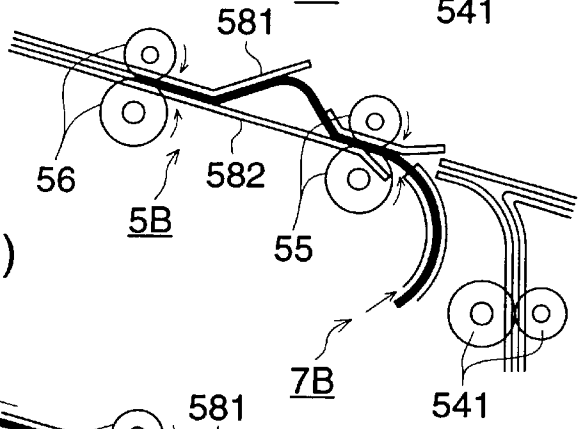
Figure 4:
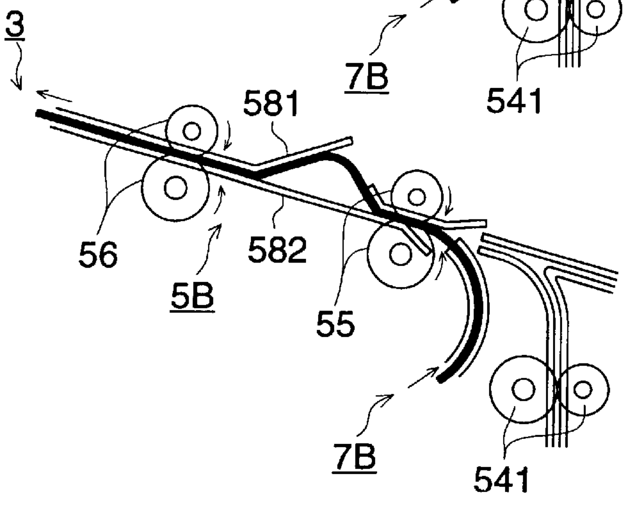
Figure 5:
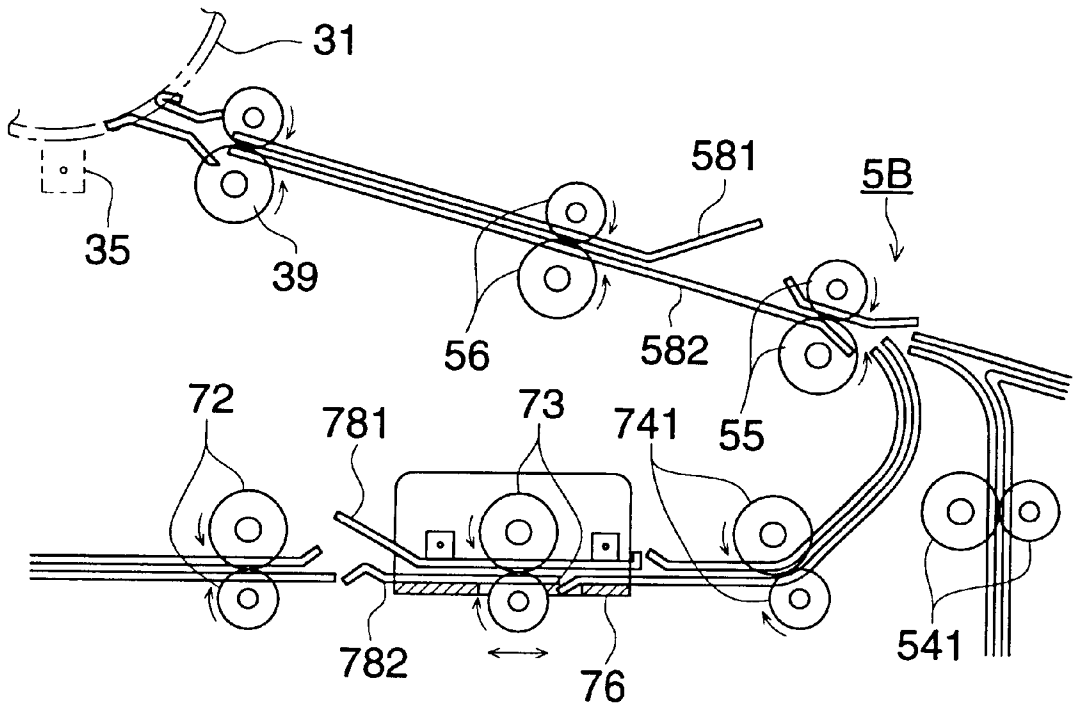
FIG. 5 is a view showing an adjustment of the first collision means in the first skew correction means.

Accordingly, in the case of the two-sided copy, the correction of the skew of the recording sheet is conducted in the sheet re-feeding conveyance section 7B and the conveyance section 5B. In FIG. 2 to FIG. 5, the correction of the skew of the recording sheet in the sheet re-feeding conveyance section 7B and the conveyance section 5B will be explained. FIG. 2 is a partial enlargement sectional view of the sheet re-feeding conveyance section and the conveyance section in FIG. 1, FIGS. 3(A)–3(D) are illustrations showing the conveyance of the recording material in the first skew correction means provided in the sheet re-feeding conveyance section, FIGS. 4(A)–4(D) are illustrations showing the conveyance of the recording material in the second skew correction means provided in the conveyance section, and FIG. 5 is a view showing an adjustment of the first collision means in the first skew correction means.

According to FIG. 2 to FIG. 4(D), as described above, the recording sheet joins the second loop formation roller 55 through the sheet re-feeding conveyance section 7B, and conveyed to the image forming means 3 through the conveyance section 5B again, and the reverse side toner image formed on the photoreceptor drum 31 is transferred onto the other side of the recording sheet (reverse side of the recording sheet) by the transfer device 35, and the two-sided image formation is conducted.

The sheet re-feeding conveyance section 7B has the first skew correction means, and is the sheet re-feeding conveyance path of the recording sheet from the sheet re-feeding conveyance roller 751 to which the recording sheet is conveyed from the sheet re-feeding reversal roller 71 of the sheet re-feeding reversal section 7A, to the second loop formation roller 55 through the first loop formation roller 72 and the pre-register roller 73, and the sheet re-feeding conveyance section 7B is structured by the sheet re-feeding conveyance rollers 751 and 752 (refer to FIG. 1), a plurality pair of which are provided at need, the first loop formation roller 72, the pre-register roller 73, and the sheet re-feeding intermediate conveyance roller 741 provided at need, in the conveyance direction of the recording sheet.

The first skew correction means is structured by the pre-register roller 73 which is the first collision means, and the first loop formation roller 72 which is the first loop formation means, and a loop is formed on the conveyed recording sheet and thereby, the correction of the sheet skew is conducted. Further, in the present embodiment, in order to assuredly conduct the loop formation, an upper guide 781 and a lower guide 782 are provided as a guide member (loop formation guide) to guide the conveyance of the recording sheet, between the first loop formation roller 72 and the pre-register roller 73. In the present embodiment, the upper guide 781 is structured in an angled-form in the sectional form (viewed as in FIGS. 1 and 2), and functions as the loop formation guide which guides the recording sheet to a loop-form along the upper guide 781.

The first loop formation roller 72 is a means for conveying the recording sheet which is conveyed by the sheet re-feeding conveyance rollers 751 and 752 (refer to FIG. 1). The first loop formation roller 72 is structured by a pair of opposition rollers and provided so as to be rotatable in the arrowed direction by the drive means, not shown, and is provided on the sheet re-feeding conveyance path of the sheet re-feeding conveyance section 7B.

The pre-register roller 73 is the first collision means with which the recording sheet conveyed by the first loop formation roller 72 temporarily collides, and after that, by which the conveyance of the recording sheet is re-started, and so-called register roller. This pre-register roller 73 is structured by a pair of opposition rollers and provided so as to be rotatable in the arrowed direction by the drive means, not shown, and is provided on the sheet re-feeding conveyance path of the sheet re-feeding conveyance section 7B.

The conveyance operation of the recording sheet in the sheet re-feeding conveyance section 7B is shown in FIGS. 3(A)–3(D). The recording sheet shown a bold line which is conveyed from the sheet re-feeding conveyance rollers 751 and 752 (refer to FIG. 1) to the first loop formation roller 72, is conveyed by the rotating first loop formation roller 72 (FIG. 3(A)). The rotation of the pre-register roller 73 is stopped when the recording sheet is conveyed by the first loop formation roller 72, therefore, the conveyed recording sheet temporarily collides with the register roller 56, and its leading edge is stopped. Also after the recording sheet collides with the pre-register roller 73, the conveyance of the recording sheet by the first loop formation roller 72 is continued (FIG. 3(B)). Accordingly, the recording sheet whose leading edge is stopped by the pre-register roller 73, forms a loop between the pre-register roller 73 and the first loop formation roller 72, as shown in FIG. 3(C), by the conveyance by the further rotation of the first loop formation roller 72. In this case, the loop is assuredly formed in the appropriate form by the upper and lower guides 781 and 782, and an adequate loop can be formed, thereby, the skew correction of the recording sheet which collides with the pre-register roller 73, can be assuredly conducted. Specifically, after fixing, a large sheet skew generated by causes of an increase of frictional resistance between the recording material and the conveyance guides or an increase of slippage between the recording material and conveyance rollers, in the long conveyance path of the recording material to the reversal and sheet re-feeding means in which the recording sheet is reversed in the sheet re-feeding reversal section, and the recording sheet is re-fed in the sheet re-feeding conveyance section through the delivery sheet and reversal means for the two-sided image formation, is temporarily corrected by the first skew correction means. Then, simultaneously with that the above-described loop is formed between the first loop formation roller 72 and the pre-register roller 73, the rotation of the pre-register roller 73 is started based on the re-start signal of the pre-register roller 73 by the control means, not shown, and in the situation that the first loop formation roller 72 and all of the roller pairs to convey the recording sheet which is positioned from the separation position of the photoreceptor drum 31 to the sheet re-feeding conveyance section 7B in the present embodiment, keep their rotation, and the loop formation is made, the recording sheet is conveyed from the pre-register roller 73, and conveyed to the conveyance section 5B again by the sheet re-feeding intermediate conveyance roller 741 (FIG. 3(D)). Accordingly, the recording sheet is not stopped, but conveyed on the sheet re-feeding path of the sheet re-feeding conveyance section 7B. When the skew of the recording sheet is corrected by the first skew correction means, jam in the conveyance of the recording sheet in the conveyance guide (no code) in the path from the sheet re-feeding intermediate conveyance roller 741 to the conveyance section 5B, can also be prevented.

Incidentally, in the present embodiment, the pre-register roller 73 is structured such that it is used for the first collision means with which the recording sheet collides, and also a portion of the first skew correction means to correct the skew of the recording sheet, thereby, the number of parts is decreased, however, respective functions may be separately provided. In this case, when only collision of the recording sheet is carried out, it is not necessary that the collision means is structured by a roller pair, but, for example, the first collision means may be a shutter or stopper which can block the sheet re-feeding path.

The conveyance section 5B has the second skew correction means, and is the feeding path of the recording sheet from the second loop formation roller 55 to the transfer position of the photoreceptor drum 31, and the conveyance section 5B is structured by the second loop formation roller 55, register roller 56, and the conveyance roller before the drum 39 provided at need. In the case of the reverse side image formation, the recording sheet conveyed by the sheet re-feeding intermediate conveyance roller 741, is fed to the image forming means 3 through the conveyance section 5B.

The second skew correction means is structured by the register roller 56 serving as the second collision means, and the second loop formation roller 55 serving as the second loop formation means, and a means by which the sheet skew is corrected by forming the loop on the conveying recording sheet. Further, in the present embodiment, in order to assuredly form the loop, an upper guide 581 and a lower guide 582 are provided as a guide member (loop formation guide) to guide the conveyance of the recording sheet, between the second loop formation roller 55 and the register roller 56. In the present embodiment, the upper guide 581 is structured in an angled-form in the sectional form (viewed as in FIGS. 1 and 2), and functions as the loop formation guide which guides the recording sheet to a loop form along the upper guide 581.

The second loop formation roller 55 is a means for conveying the recording sheet which is conveyed by the sheet re-feeding intermediate conveyance roller 741. Incidentally, when the recording sheet is fed from the recording material accommodating means 4, the recording sheet conveyed by the intermediate conveyance roller 541 is conveyed. The second loop formation roller 55 is structured by a pair of opposition rollers and provided so as to be rotatable in the arrowed direction by the drive means, not shown, and is provided on the sheet feeding path of the conveyance section 5B.

The register roller 56 is the second collision means with which the recording sheet conveyed by the second loop formation roller 55 temporarily collides, and after that, by which the conveyance of the recording sheet is re-started. This register roller 56 is structured by a pair of opposition rollers and provided so as to be rotatable in the arrowed direction by the drive means, not shown, and is provided on the sheet feeding path of the conveyance section 5B.

Conveyance operations of the recording sheet in the conveyance section 5B are as shown in FIGS. 4(A)–4(D). On the feeding path in the conveyance section 5B, the recording sheet shown by a bold line conveyed from the sheet re-feeding intermediate conveyance roller 741 (refer to FIG. 2) in the sheet re-feeding conveyance section 7B to the second loop formation roller 55, is conveyed by the rotating second loop formation roller 55 (FIG. 4(A)). The rotation of the register roller 56 is stopped when the recording sheet is conveyed by the second loop formation roller 55, and therefore, the conveyed recording sheet temporarily collides with the register roller 56, and its leading edge is stopped. After the recording sheet collides with the register roller 56, the conveyance of the recording sheet by the second loop formation roller 55 is also continued (FIG. 4(B)). Accordingly, the recording sheet whose leading edge is stopped by the register roller 56, forms a loop between the register roller 56 and the second loop formation roller 55 as shown in FIG. 4(C), by the conveyance by further rotation of the second loop formation roller 55. In this case, the formed loop can be assuredly formed into an appropriate form and an adequate loop can be formed, by the upper and lower guides 581 and 582, and the recording sheet collides with the register roller 56, thereby, the skew correction of the recording sheet can be further assuredly conducted.

Specifically, after fixing, the sheet skew which can not be corrected in the first skew correction means, in a large sheet skew generated by causes of an increase of frictional resistance between the recording material and the conveyance guides or an increase of slippage between the recording material and conveyance rollers, in the long conveyance path of the recording material to the reversal and sheet re-feeding means in which the recording sheet is reversed in the sheet re-feeding reversal section, and the recording sheet is re-fed in the sheet re-feeding conveyance section through the delivery sheet and reversal means for the two-sided image formation, is further corrected. Then, simultaneously when the loop is formed between the second loop formation roller 55 and the register roller 56, the rotation of the register roller 56 is started based on the register roller re-start signal by the control means, not shown, and in the situation that the rotation of the second loop formation roller 55 and the intermediate conveyance roller 541 is kept, and that the loop formation remains kept, the recording sheet is conveyed by the resister roller 56, and conveyed again to the image forming means 3 (FIG. 4(D)) through the conveyance roller before the drum 39 (refer to FIG. 2). Accordingly, the recording sheet is conveyed on the sheet feeding path of the conveyance section 5B without being stopped. Then, the latent image formation of the reverse side image by the laser writing system 33 is started in timed relationship with the recording sheet fed by the register roller 56, and the recording sheet is in timed relationship with the reverse side toner image on the photoreceptor drum 31. Thus, when the recording sheet temporarily collides with the register roller 56, the timing of the leading edge of the recording sheet can be correctly timed, and fluctuations of the conveyance can be suppressed, and synchronization of the laser writing system 33 can be easily timed, and thereby, the image can be formed at a correct position on the recording sheet. Further, when the skew of the recording sheet is corrected by the second skew correction means, the sheet skew which can not be corrected by the first skew correction means, is further corrected, and positioning of the reverse side image on the recording sheet can be correct.

The feeding method of the recording sheet in the same manner as thee description in FIGS. 4(A)–4(D) may be adopted also at the time of the feeding of the recording sheet from the recording sheet accommodating means 4 through the intermediate conveyance roller 541, however, in the present embodiment, as described in FIG. 1, at the time of the feeding of the recording sheet from the recording sheet accommodating means 4 through the intermediate conveyance roller 541, the register roller 56, the second loop formation roller 55 and the intermediate conveyance roller 541 are temporarily stopped in the situation that the loop formation remains kept, and by the drive of the register roller 56, the second loop formation roller 55 and the intermediate conveyance roller 541 according to the register roller re-start signal by the control means, not shown, the recording sheet is in timed relationship with the toner image carried on the photoreceptor drum 31, and fed to the transfer area of the photoreceptor drum 31 in which the transfer device 35 is arranged.

Incidentally, in the present embodiment, the register roller 56 is structured such that it is used for the second collision means with which the recording sheet collides, and also for a portion of the second skew correction means to correct the skew of the recording sheet, thereby, the number of parts is decreased, however, respective functions may be separately provided. In this case, when only collision of the recording sheet is carried out, it is not necessary that the collision means is structured by a roller pair, but, for example, the second collision means may be a shutter or stopper which can block the sheet feeding path.

Further, as the first skew correction means in the sheet re-feeding conveyance section 7B, as shown in FIG. 5, a roller pair of the pre-register roller 73 which is the first collision means of the first skew correction means, and the upper guide 781 and the lower guide 782 serving as the guide member (loop formation guide) are structured into a unit structure which is structured such that these are attached onto an L-shaped plate member 76 which is long in the perpendicular direction to the conveyance direction of the recording sheet. For example, one side of the plate member 76 is defined as the reference (fixed fulcrum), and the plate member 76 can be moved by several mm, for example, 2–3 mm, perpendicular to the conveyance direction of the recording sheet, as shown by an arrow in FIG. 5, and at assembling, an amount of the sheet skew which is necessary for correction of the first skew correction means and the second skew correction means, for example, a habit of sheet skew, or the like, which are previously measured, and which are generated in the long conveyance path of the recording material to the reversal and sheet re-feeding means in which the recording sheet is reversed in the sheet re-feeding reversal section, and the recording sheet is re-fed in the sheet re-feeding conveyance section through the delivery sheet and reversal means for the two-sided image formation, after fixing, is previously measured; and in the case where the amount of the sheet skew can not be corrected by the first skew correction means when the first skew correction means is arranged perpendicular to the conveyance direction of the recording sheet, for example, when the correction amount of the sheet skew at the position of the second skew correction means is necessary for 2 mm, the first skew correction means is adjusted and fixed such that it is tilted by about 1 mm perpendicular to the conveyance direction of the recording sheet, and the residual amount which can be corrected by the second skew correction means (a residual amount which can not be corrected by the first skew correction means), for example, 1 mm is corrected by the second skew correction means. According to this, the sheet skew which is generated in the long conveyance path of the recording material to the reversal and sheet re-feeding means in which the recording sheet is reversed in the sheet re-feeding reversal section, and the recording sheet is re-fed in the sheet re-feeding conveyance section through the delivery sheet and reversal means for the two-sided image formation, after fixing, at the time of the reverse side image formation, is assuredly corrected by the first skew correction means and the second skew correction means, and the width of the correction amount of the sheet skew can be increased.

Incidentally, in the above description, only roller pair of the pre-register roller 73 serving as the first collision means may be made to be adjustable.

As described above, according to the present invention, the sheet skew which is generated in the long conveyance path of the recording material as far as the reversal and sheet re-feeding means in which the recording sheet is reversed in the sheet re-feeding reversal section, and the recording sheet is re-fed in the sheet re-feeding conveyance section through the delivery sheet and reversal means for the two-sided image formation, after fixing, at the time of the reverse side image formation, is assuredly corrected by the first skew correction means and the second skew correction means, and the reverse side toner image is formed at a correct position on the recording sheet, thereby, fine two-sided image formation can be carried out.

Incidentally, the above effect can also be attained by the structure of only the first collision means and the second collision means, or the structure in which the loop formation guide and loop formation means (the first loop formation means or the second loop formation means) is added to at least any one of the first collision means and the second collision means, and these structures are of course included in the present invention.

According to the present invention, the sheet skew of the recording material conveyed on the reversal and sheet re-feeding means is corrected, and the reverse toner image is formed at the correct position on the recording material, thereby, fine two-sided image formation can be carried out.

What is claimed is:

1. An image forming apparatus comprising:

(a) a recording material accommodating means for accommodating recording materials;

(b) an image forming means for forming an image on the recording material;

(c) a conveyance section for conveying the recording material fed from the recording material accommodating means to the image forming means;

(d) a reversal and re-feeding means having a sheet reversal section and a sheet re-feeding section for conducting image formation on two sides of the recording material;

wherein after the image is formed by the image forming means on one side surface of the recording material conveyed from the recording material accommodating means through the conveyance section, the recording material is conveyed to the reversal and re-feeding means, and conveyed again to the image forming means through the sheet re-feeding section of the reversal and re-feeding means and the conveyance section, and an image is formed on the other side surface of the recording material by the image forming means;

(e) a first regulating means provided on the sheet re-feeding section of the reversal and re-feeding means for correcting a skew of the recording material conveyed, by forming a loop with the recording material; and (f) a second regulating means provided on the conveyance section in the vicinity of the image forming material for regulating the recording material conveyed, wherein the first regulating means comprises a first loop forming means for forming the loop with the recording material and a first collision means with which a leading edge of the recording material conveyed collides, and the first collision means is provided downstream of a conveyance direction of the recording material with respect to the first loop forming means.

2. The image forming apparatus of claim 1, wherein the first regulating means further comprises a loop forming guide provided between the first loop forming means and the first collision means, for forming the loop with the recording material.

3. The image forming apparatus of claim 2, wherein the first collision means and the loop forming guide are attached to an L-shaped plate member which is long in a direction perpendicular to a conveyance direction of the recording material to thereby form a unit, and wherein one side of the L-shaped plate member is defined as a fixed fulcrum, and the other side of the L-shaped plate member is moved in the direction perpendicular to the conveyance direction of the recording material.

4. The image forming apparatus of claim 1, wherein the first regulating means is movable for correcting a skew of the recording material.

5. An image forming apparatus comprising:

(a) a recording material accommodating means for accommodating recording materials;

(b) an image forming means for forming an image on the recording material;

(c) a conveyance section for conveying the recording material fed from the recording material accommodating means to the image forming means;

(d) a reversal and re-feeding means having a sheet reversal section and a sheet re-feeding section for conducting image formation on two sides of the recording material, wherein after the image is formed by the image forming means on one side surface of the recording material conveyed from the recording material accommodating means through the conveyance section, the recording material is conveyed to the reversal and re-feeding means, and conveyed again to the image forming means through the sheet re-feeding section of the reversal and re-feeding means and the conveyance section, and an image is formed on the other side surface of the recording material by the image forming means;

(e) a first regulating means provided on the sheet re-feeding section of the reversal and re-feeding means for regulating the recording material conveyed; and (f) a second regulating means provided on the conveyance section in the vicinity of the image forming material for correcting a skew of the recording material conveyed, by forming a loop with the recording material; and wherein the second regulating means comprises a second loop forming means for forming the loop with the recording material and a second collision means with which a leading edge of the recording material conveyed collides, and the second collision means is provided downstream of a conveyance direction of the recording material with respect to the second loop forming means.

6. The image forming apparatus of claim 5, wherein the second regulating means further comprises a loop forming guide provided between the second loop forming means and the second collision means, for forming the loop with the recording material.

7. An image forming apparatus comprising:

(a) a recording material accommodating means for accommodating recording materials;

(b) an image forming means for forming an image on the recording material;

(c) a conveyance section for conveying the recording material fed from the recording material accommodating means to the image forming means;

(d) a reversal and re-feeding means having a sheet reversal section and a sheet re-feeding section for conducting image formation on two sides of the recording material, wherein after the image is formed by the image forming means on one side surface of the recording material conveyed from the recording material accommodating means through the conveyance section, the recording material is conveyed to the reversal and re-feeding means, and conveyed again to the image forming means through the sheet re-feeding section of the reversal and re-feeding means and the conveyance section, and an image is formed on the other side surface of the recording material by the image forming means;

(e) a first regulating means provided on the sheet re-feeding section of the reversal and re-feeding means for regulating the recording material conveyed; and (f) a second regulating means provided on the conveyance section in the vicinity of the image forming material for regulating the recording material conveyed, wherein the first and second regulating means include first and second collision means, respectively for stopping the recording material to control a conveyance timing of the recording material.

* * * * *